US007947764B2

(12) United States Patent
Shinohara et al.

(10) Patent No.: US 7,947,764 B2

(45) Date of Patent: May 24, 2011

(54) CATIONIC ELECTRODEPOSITION COATING COMPOSITIONS

(75) Inventors: Masaaki Shinohara, Hiratsuka (JP); Toshiharu Soga, Atsugi (JP); Naoya Haruta, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 1176 days.

(21) Appl. No.: 11/485,476

(22) Filed: Jul. 13, 2006

(65) Prior Publication Data

US 2007/0023736 A1 Feb. 1, 2007

(30) Foreign Application Priority Data

Jul. 13, 2005 (JP) ................................ 2005-204860

(51) Int. Cl.
*C04B 9/02* (2006.01)

(52) U.S. Cl. ........ 523/440; 523/408; 523/411; 523/468; 523/220; 106/14.44; 524/495

(58) Field of Classification Search .................. 523/160, 523/161; 106/31.95
See application file for complete search history.

(56) References Cited

U.S. PATENT DOCUMENTS

| | | | | |
|---|---|---|---|---|
| 5,510,400 | A * | 4/1996 | Kageyama et al. | 523/404 |
| 5,527,641 | A * | 6/1996 | Koshiishi et al. | 429/163 |
| 6,476,101 | B2 * | 11/2002 | Takegawa et al. | 523/404 |
| 2003/0106804 | A1 * | 6/2003 | Nishiguchi et al. | 205/413 |

FOREIGN PATENT DOCUMENTS

| | | | |
|---|---|---|---|
| EP | 1 505 674 | | 2/2005 |
| JP | 2001-2736 | * | 1/2001 |
| JP | 2004-31166 | | 1/2004 |

OTHER PUBLICATIONS

Machine translation of JP 2001-2736.*

* cited by examiner

*Primary Examiner* — Vasu Jagannathan
*Assistant Examiner* — Doris L Lee
(74) *Attorney, Agent, or Firm* — Wenderoth, Lind & Ponack L.L.P.

(57) ABSTRACT

This invention provides a cationic electrodeposition coating composition which exhibits high paint stability, forms coating film excelling in conductivity, intimate adhesion, corrosion resistance, finished appearance and acid resistance, and is capable of forming uniform electrocoated film also on substrates having uneven surfaces, characterized by comprising a conductive filler dispersion paste, base resin and a curing agent, said paste being formed by dispersing a conductive filler (A) composed of high conductive carbon black ($a_1$) and at least one conductive powder ($a_2$) selected from furnace black, graphite and conductive whisker, using a pigment-dispersing resin (B), the composition (i) containing 30-100 wt parts of a conductive filler (A) which contains at least 2 wt parts of high conductive carbon black ($a_1$), per 100 wt parts of combined solid content of the base resin and the curing agent, (ii) the weight ratio of the conductive powder ($a_2$)/high conductive carbon black ($a_1$) being within a range of 0.4-20, and (iii) the pigment-dispersing resin (B) being acrylic resin-derived pigment-dispersing resin formed by copolymerization of (meth)acrylic monomer ($b_1$) which is modified with mono- or poly-alkylene glycol or a monoether derivative thereof; nitrogen-containing, radical-polymerizable unsaturated monomer ($b_2$) and other radical-polymerizable unsaturated monomer ($b_3$).

17 Claims, No Drawings

CATIONIC ELECTRODEPOSITION COATING COMPOSITIONS

TECHNICAL FIELD

This invention relates to cationic electrodeposition coating compositions capable of forming conductive coating film.

BACKGROUND ART

In these years, adverse influence of the gas, which is generated upon combustion of petroleum fuel, on terrestrial environments creates problems, and as a means for acquiring energy such as power and heat with no generation of waste gases including carbon dioxide and nitrogen dioxide, fuel cells are developed in consideration of environmental preservation.

Of fuel cells, solid electrolytic a fuel cell composed of a separator, fuel electrode, solid electrolyte, gas-diffusion electrode and a separator has compact size and light weight, and its utilization in various fields is under investigation.

Separators in solid electrolytic fuel cells are formed of electrically conductive material to allow taking out of electric power, which are normally provided with uneven grooves on their surfaces for efficient permeation of the reactive gases (oxygen, hydrogen or the like) which are generated at the electrode surface. As the material for separators having such function and configuration, graphite has been conventionally used. Graphite, however, is expensive and requires high skill for its cutting processing, and also is subject to a problem in physical strength.

It was proposed, therefore, to use as the separators flat sheet-formed conductive metallic materials with or without uneven grooves formed on their surfaces, which are coated with electrically conductive paint. (Those separators with unevenly formed surfaces are called ribbed separators.) Generally speaking, it is difficult to uniformly apply electrically conductive paint on metallic material surface by such means as spray coating or roller coating. In particular, with ribbed separators it is extremely difficult to uniformly form an electrically conductive coating film thereon.

JP 2004-31166A discloses electrocoating metallic separators of solid electrolytic fuel cells with electrodeposition paint containing electrically conductive powder such as metal powder, metal-coated powder, carbonaceous powder or the like. However, so obtained coating film fails to reach the levels of conductivity, intimate adherability, corrosion resistance and acid resistance required by users (for example, as to electric resistance, the coating film is required to have a value not higher than 50 Ω) and, furthermore, shows degraded finish, e.g., occurrence of pinholes.

DISCLOSURE OF THE INVENTION

The object of the present invention is to provide cationic electrodeposition coating compositions of good stability, which are capable of forming uniform electrodeposited coating film even on ribbed separators, said film excelling in conductivity, intimate adherability, corrosion resistance, finished appearance and acid resistance.

The present inventors engaged in concentrative studies for accomplishing the above object and have now discovered that cationic electrodeposition coating compositions excelling in paint stability, which could form coating film of excellent conductivity, intimate adhesion, corrosion resistance, finished appearance and acid resistance, could be obtained by using a high conductive carbon black represented by Ketjen Black, in combination with furnace black in combination with furnace black, graphite and/or conductive whisker, as a conductive filler, forming a dispersion paste of the conductive filler using a specific acrylic resin-type pigment-dispersing resin and blending the paste with a cationic electrodeposition coating composition. The present invention is whereupon completed.

Thus, the present invention provides a cationic electrodeposition coating composition which is characterized by comprising a conductive filler dispersion paste, base resin and a curing agent, said paste being formed by dispersing a conductive filler (A) composed of high conductive carbon black ($a_1$) and at least one conductive powder ($a_2$) selected from furnace black, graphite and conductive whisker using a pigment-dispersing resin (B);

(i) containing 30-100 wt parts of a conductive filler (A) which contains at least 2 wt parts of high conductive carbon black ($a_1$), per 100 wt parts of combined solid content of the base resin and the curing agent;

(ii) the weight ratio of the conductive powder ($a_2$)/high conductive carbon black ($a_1$) being within a range of 0.4-20; and (iii) the pigment-dispersing resin (B) being acrylic resin-derived pigment-dispersing resin formed by copolymerization of (meth)acrylic monomer ($b_1$) which is modified with mono- or poly-alkylene glycol or a monoether derivative thereof;

nitrogen-containing, radical-polymerizable unsaturated monomer ($b_2$) and other radical-polymerizable unsaturated monomer ($b_3$).

Those cationic electrodeposition coating compositions according to the present invention are well suited for coating separators in solid electrolytic fuel cells because coating film formed therefrom excels in conductivity, can easily form electrodeposited coating film having, in particular, an electrical resistance not higher than 50 Ω and the coating film excels in intimate adhesion, corrosion resistance, finished appearance and acid resistance.

Still in addition, the cationic electrodeposition coating compositions according to the present invention have high paint stability. Their use in coating lines over long period does not cause increase in filteration residue or degradation in finished appearance of coating film. The cationic electrodeposition coating compositions of the present invention also exhibit good throwing power on ribbed separators and can form uniform conductive coating film thereon.

Hereinafter the cationic electrodeposition coating compositions of the present invention are explained in further details.

Conductive Filler (A)

The invention uses, as the conductive filler for imparting conductivity to electrodeposited coating film, high conductive carbon black ($a_1$) in combination with a conductive powder ($a_2$) selected from furnace black, graphite and conductive whisker.

High Conductive Carbon Black ($a_1$)

High conductive carbon black ($a_1$) is a carbon black represented by KETJEN BLACK developed by Akzo Novel Chemicals B. V. of The Netherlands, which has a hollow shell structure and a characteristic property that it can impart conductivity to resin with less use rate than that of other kinds of carbon black.

High conductive carbon black ($a_1$) which is used in the present invention preferably has a DBP oil absorption within a range of 250-600 ml/100 g, in particular, 350-500 ml/100 g, and a specific surface area (as measured by BET method) of 700-1,400 $m^2/g$, in particular, 800-1,300 $m^2/g$.

In this specification, "DBP oil absorption" is the value measured by the following method.

A dry sample 1.0 g is accurately measured out and transferred onto a smooth glass sheet or stone sheet of a size not less than 300 mm×300 mm. Where the sample is granular, it is crushed under a suitable pressure exerted with a spatula. About ½ of DBP (d-n-butyl phthalate) of the amount estimated necessary is gently poured through a burette on the glass sheet or stone sheet to circularly and uniformly spread the DBP, and then the sample is transferred on the DBP little by little, dispersed and carefully kneaded with small encircling motions of the spatula.

The sample adhered on the spatula is removed with another spatula, and further about ⅓-¼ of the DBP of the amount estimated necessary is added. The mixture is homogenized by repeating the above-described operations. At the stage close to the end, DBP is added a drop after a drop, and at the stage closer to the end, ½ drop after ½ drop, until the whole system turns into one, coherent mass. The whole operation takes, all in all, 10-15 minutes. Three minutes after the end of the operation, the dropped amount of the DBP in the burette is read, and the oil absorption: OA (ml/100 g) is calculated according to the following equation:

$$OA=(V/W)\times 100$$

[in which V is the amount (ml) of the oil used up to the end point, and W is the weight (g) of the dry sample].

As the high conductive carbon black ($a_1$), for example, commercial products such as Ketjen Black EC, Ketjen Black EC 600 JD, carbon ECP, Carbon ECP 600 JD (tradenames, Lion Corporation) can be used.

Electrically Conductive Powder ($a_2$)

According to the invention, at least one conductive powder ($a_2$) selected from furnace black, graphite and conductive whisker is used in combination with above-described high conductive carbon black ($a_1$). The concurrent use of such conductive powder ($a_2$) with high conductive carbon black ($a_1$) renders the electroconductive route formed in the electrodeposited coating film denser. In particular, by combining the high conductive carbon black ($a_1$) which inherently has the property of imparting electric conductivity to resin when added in a minor amount, with conductive powder ($a_2$) as above, even when the combined content of the high conductive carbon clack ($a_1$) and conductive powder ($a_2$) in the electrodeposition coating film is relatively low, conductivity of the formed coating film can be satisfactorily secured, and hence use of the coating compositions of the invention in coating lines over a long term does not cause filter occlusion, and coated articles excelling in finished appearance and impact strength of the coating film can be obtained.

The conductive powder ($a_2$) can take any desired form such as granular, platy or staple fiber, and can have an average particle size normally within a range of 0.01-100 μm, in particular, 0.02-80 μm. The conductive powder ($a_2$) furthermore preferably has a specific surface area within a range of 0.1-1300 $m^2/g$, in particular, 0.5-500 $m^2/g$. Still in addition, the conductive powder ($a_2$) preferably has a DBP oil absorption within a range of 30-250 ml/100 g, in particular, 50-200 ml/100 g.

As such conductive filler ($a_2$), for example, such commercial products as, VULKAN XC-72, VULKAN XC-605 (tradenames, Cabot Corp., furnace black); RAVEN 1255 (tradename, Columbia Carbon Co., furnace black); RP Series and AGB Series (tradenames, Ito Graphite Co., graphite); Graphite Powder SP-10, SP-20, HAG-15, HAG-150, HAG-300 (tradenames, Nippon Graphite Co., graphite); Artificial Graphite POG-2, POG-10, POG-20 (tradenames, Sumitomo Chemical Co., Ltd., graphite); UFG-5, UFG-10, UFG-30 (tradenames, Showa Denko K. K., graphite); DENTOL BK-400 (tradename, Otsuka Chemical Co., potassium titanate, conductive whisker) and the like can be used. They can be used each singly or in combination of two or more.

Formulation of Conductive Filler Dispersion Paste

Above described conductive filler (A) composed of the high conductive carbon black ($a_1$) and conductive powder ($a_2$) is dispersed with an acrylic resin type pigment dispersing resin (B), in advance of its blending in a cationic electrodeposition coating composition, to form a conductive filler dispersion paste.

As a pigment dispersing resin, further an onium salt-type pigment dispersing resin (C) may be concurrently used.

Acrylic Resin Type Pigment Dispersing Resin (B):

Acrylic resin type pigment dispersing resin (B) signifies pigment dispersing resin formed by copolymerizing (meth) acrylic monomer ($b_1$) modified with mono- or poly-alkylene glycol or a monoether derivative thereof [which may be hereafter referred to as "modified (meth)acrylic monomer ($b_1$)"], nitrogen-containing, radical-polymerizable unsaturated monomer ($b_2$), and other radical-polymerizable unsaturated monomer ($b_3$).

Modified (meth)acrylic Monomer ($b_1$)

(meth)acrylic monomers ($b_1$) which are modified with mono- or poly-alkylene glycols or monoether derivatives thereof include esterified products of (meth)acrylic acid with mono- or poly-alkylene glycols or monoether derivatives thereof, for example those represented by the following general formula (1),

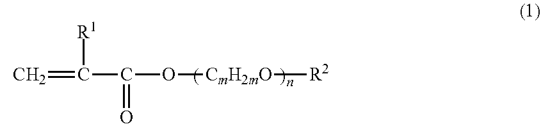

(1)

[in which $R^1$ stands for hydrogen or methyl; $R^2$ stands for hydrogen, $C_1$-$C_{20}$ alkyl, aryl or aralkyl, preferably hydrogen, $C_1$-$C_{10}$ alkyl, phenyl or benzyl; m is an integer of 2-12, preferably 2 or 3; and n is an integer of 1-30, preferably 2-25]

can be named.

As specific examples of such modified (meth)acrylic monomer ($b_1$), diethylene glycol (meth)acrylate, triethylene glycol (meth)acrylate, tetraethylene glycol (meth)acrylate, polyethylene glycol (meth)acrylate, dipropylene glycol (meth)acrylate, tripropylene glycol (meth)acrylate, polypropylene glycol (meth)acrylate, 1,3-butylene glycol (meth) acrylate, 2-methoxyethyl (meth) acrylate, 2-ethoxyethyl (meth)acrylate, 2-butoxyethyl (meth)acrylate, 2-hexyloxyethyl (meth)acrylate, 2-ethoxypropyl (meth)acrylate, diethylene glycol (meth)acrylate ethyl ether, diethylene glycol (meth)acrylate butyl ether, diethylene glycol (meth)acrylate dodecyl ether, dipropylene glycol (meth)acrylate phenyl ether, 2-benzyloxyethyl (meth)acrylate and the like can be named, which can be used each singly or in combination of two or more.

These modified (meth)acrylic monomers ($b_1$) can normally have number-average molecular weight(note 1) within a range of 100-5,000, preferably 150-1,500.

(note 1) Number-average molecular weight: a value determined according to JIS K 0124-83, as calculated from a chromatograph drawn with R1 refractometer at 40° C. and a flow rate of 1.0 ml/min., using as the separation columns TSK GEL 4000HXL+G3000HXL+G2500HXL+G2000HXL (tradename, Tosoh Corporation) and as the eluent, tetrahydrofuran for GPC, and calibration line of polystyrene.

Nitrogen-containing, Radical-polymerizable Unsaturated Monomer ($b_2$):

Nitrogen-containing, radical-polymerizable unsaturated monomer ($b_2$) includes monomers containing one or more basic nitrogen atoms and one ethylenically unsaturated bond per molecule, typical examples being unsaturated monomers ($b_2$-1) having nitrogen-containing heterocycle, and nitrogen-containing derivatives ($b_2$-2) of (meth)acrylic acid. Hereafter these monomers are explained more specifically.

The unsaturated monomer ($b_2$-1) having nitrogen-containing heterocycle includes monomers in which mono- or polycyclic heterocycle containing 1-3, preferably 1 or 2, nitrogen atoms binds to vinyl group and, for example, the following monomers can be named:

(1) vinylpyrrolidones such as 1-vinyl-2-pyrrolidone, 1-vinyl-3-pyrrolidone and the like;

(2) vinylpyridines such as 2-vinylpyridine, 4-vinylpyridine, 5-methyl-2-vinylpyridine, 5-ethyl-2-vinylpyridine and the like;

(3) vinylimidazoles such as 1-vinylimidazole, 1-vinyl-2-methylimidazole and the like;

(4) vinylquinolines such as 2-vinylquinoline and the like;

(5) vinylpiperidines such as 3-vinylpiperidine, N-methyl-3-vinylpiperidine and the like;

(6) N-(meth)acryloylmorpholines represented by the following formula (2)

(2)

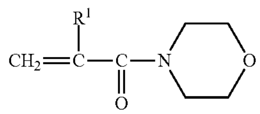

[in which $R^1$ has the previously defined significance], N-(meth)acryloylpyrrolidines represented by the following formula (3)

(3)

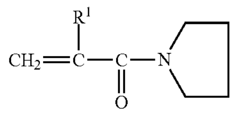

[in which $R^1$ has the previously defined significance]

and the like.

Among those vinyl monomers having nitrogen-containing heterocycles, vinylpyrrolidones and vinylimidazoles are particularly preferred, in particular, those in which the nitrogen atom(s) on their heterocycle are tertiarized are advantageous.

Nitrogen-containing derivatives ($b_2$-2) of (meth)acrylic acid include (meth)acrylic acid esters containing in the ester moiety substituted or unsubstituted amino group and amides of (meth)acrylic acid. In particular, aminoalkyl (meth)acrylates or (meth)acrylamides represented by the formula (4) or (5)

(4)

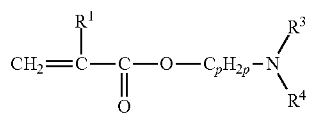

(5)

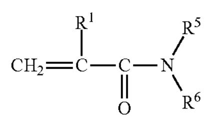

[in which $R^1$ has the previously defined significance; $R^3$ and $R^4$ each stands for hydrogen or lower alkyl, independently of each other; $R^5$ and $R^6$ each stands for hydrogen, lower alkyl, di(lower alkyl)amino lower alkyl, hydroxy lower alkyl or lower alkoxy lower alkyl independently of each other; and p is an integer of 2-8] and their derivatives are preferred. Here the term, "lower" signifies that the groups referred to with this adjective have not more than 6, preferably not more than 4, carbon atoms.

Specific examples of such nitrogen-containing derivatives ($b_2$-2)of (meth)acrylic acid include N,N-dimethylaminoethyl (meth)acrylate, N,N-diethylaminoethyl (meth)acrylate, N-t-butylaminoethyl (meth)acrylate, N,N-dimethylaminopropyl (meth)acrylate, N,N-dimethylaminobutyl (meth)acrylate, N-propylaminoethyl (meth)acrylate, N-butylaminoethyl (meth)acrylate, and the like can be named as examples of aminoalkyl (meth)acrylate of above formula (4) and derivatives thereof, and (meth)acrylamide, N-methyl (meth)acrylamide, N-ethyl (meth)acrylamide, N-butyl (meth)acrylamide, N,N-diethyl (meth)acrylamide, N-hydroxymethyl (meth) acrylamide, N-ethoxymethyl (meth)acrylamide, N-butoxymethyl (meth)acrylamide, N,N-dimethylaminopropyl (meth) acrylamide and the like are included among examples of (meth)acrylamide of above formula (5) and derivatives thereof.

As the nitrogen-containing derivatives ($b_2$-2) of (meth) acrylic acid, those whose nitrogen is tertiarized are the optimum. Those in which the nitrogen is secondarized can be conveniently used as the second best. These nitrogen-containing, radical-polymerizable unsaturated monomer ($b_2$) can be used each singly or in combination of two or more.

Other Radical-polymerizable Unsaturated Monomer ($b_3$):

Other radical-polymerizable unsaturated monomers ($b_3$) are subject to no particular limitation, so long as they are copolymerizable with above-described modified (meth) acrylic monomers ($b_1$) and/or nitrogen-containing radical-polymerizable unsaturated monomers ($b_2$). For example, carboxyl-containing radical-polymerizable unsaturated monomers such as acrylic acid, methacrylic acid, crotonic acid, itaconic acid, maleic acid, maleic anhydride, fumaric acid, 2-carboxyethyl (meth)acrylate, 2-carboxypropyl (meth)acrylate and the like; $C_1$-$C_{20}$ alkyl esters of acrylic acid or methacrylic acid such as methyl acrylate, ethyl acrylate, propyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, and the like; $C_2$-$C_8$ alkenyl esters of acrylic acid or methacrylic acid such as glycidyl (meth)acrylate, allyl (meth)acrylate and the like; $C_2$-$C_8$ hydroxyalkyl esters of acrylic acid or methacrylic acid such as hydroxyethyl (meth)acrylate, hydroxypropyl (meth) acrylate and the like; $C_3$-$C_{18}$ alkenyloxyalkyl esters of acrylic acid or methacrylic acid such as allyloxyethyl acrylate, allyloxyethyl methacrylate, and the like; vinyl aromatic compounds such as styrene, α-methylstyrene, vinyltoluene, p-chlorostyrene and the like; polyolefin compounds such as butadiene, isoprene, chloroprene and the like; acrylonitrile, methacrylonitrile, methyl isopropenyl ketone and the like can be used. These other radical-polymerizable unsaturated monomers ($b_3$) can be used each singly or in combination of two or more.

Preparation of an acrylic resin-type pigment-dispersing resin (B) from above-described modified (meth)acrylic monomer ($b_1$), nitrogen-containing radical-polymerizable unsaturated monomer ($b_2$) and other radical-polymerizable unsaturated monomer ($b_3$) can be conducted by per se known copolymerization processes, for example, solution polymerization, emulsion polymerization or suspension polymerization.

Use ratios of the monomers are variable over a wide range according to physical properties desired for resulting copolymer, while from the standpoints of water-solubility, intimate adherability, corrosion resistance, finished appearance and acid resistance, generally 3-98 wt parts, preferably 10-85 wt parts, of modified (meth)acrylic monomer ($b_1$); 2-97 wt parts, preferably 3-90 wt parts of nitrogen-containing radical-polymerizable unsaturated monomer ($b_2$); and 0-91 wt parts, preferably 5-83 wt parts of other radical-polymerizable unsaturated monomer ($b_3$); are suitably used, per 100 wt parts of the total solid contents of combined monomers ($b_1$), ($b_2$) and ($b_3$).

The copolymerization is preferably conducted by solution polymerization process in which the monomers ($b_1$), ($b_2$) and ($b_3$) are reacted, for example, for normally about 1 to about 20 hours, preferably about 6 to about 10 hours, in a suitable solvent, in the presence of a polymerization catalyst, normally at about 0 to about 180° C., preferably at about 40 to about 170° C.

As the solvent, for example, ketone solvent such as methyl ethyl ketone, methyl isobutyl ketone and the like; ester solvent such as ethyl acetate, butyl acetate and the like; ether solvent such as ethylene glycol monobutyl ether; alcohol solvent such as isopropyl alcohol, n-butyl alcohol, isobutyl alcohol and the like; aliphatic hydrocarbon solvent such as n-heptane, n-hexane and the like; aromatic hydrocarbon solvent such as toluene, xylene and the like; or still other solvent such as N-methylpyrrolidone and the like can be used.

The acrylic resin type pigment-dispersing resin (B) obtained upon the copolymerization in general preferably has a number-average molecular weight of 500-150,000, preferably 1,000-100,000, from the standpoint of surface smoothness of coated film and coating stability.

The acrylic resin type pigment-dispersing resin (B) can be made soluble or dispersible in water, by stirring under addition of water, or by first neutralizing it using a neutralizing agent, for example, acetic acid, formic acid, propionic acid, butyric acid, lactic acid, oleic acid, dimethylolpropionic acid, dimethylolbutyric acid, dimethylolvaleric acid, benzoic acid or the like and then stirring under addition of water.

In addition to the above-described acrylic resin type pigment-dispersing resin (B), onium salt-type pigment-dispersing resin (C) having onium salt group such as ammonium salt group, sulfonium salt group, phosphonium salt group and the like can be concurrently used in those cationic electrodeposition coating compositions of the present invention, where necessary.

By such concurrent use of an onium salt type pigment-dispersing resin (C), conductivity of coating film can be further enhanced, and cationic electrodeposition coating compositions capable of forming coating film of still improved finished appearance and acid resistance can be obtained.

As the resin species to constitute onium salt-type pigment-dispersing resin (C), for example, epoxy resin, acrylic resin, polyester resin and alkyd resin can be named, epoxy resin being the most preferred. As such onium salt type pigment-dispersing resin (C), for example, ammonium salt-type epoxy resin formed by reacting epoxy resin with a tertiary amino-containing compound and carboxylic acid is favorably used.

Conductive filler-dispersion paste can be formulated by, for example, adding high conductive carbon black ($a_1$) and conductive powder ($a_2$) to a solution or dispersion of above-described acrylic resin-type pigment-dispersing resin (B) and, optionally, an onium salt-type pigment-dispersing resin (C), mixing them and dispersion-treating the mixture in an agitator such as ball mill, pebble mill, sand mill or the like, following ordinary formulation method of pigment-dispersion paste.

Blend ratio of the acrylic resin type pigment-dispersing resin (B) and onium salt-type pigment-dispersing resin (C) is, based on 100 wt parts of the combined solid content of the two resins, resin (B)/resin(C)=1/99/-99/1 by wt parts, preferably 10/90-90/10 by wt parts, inter alia, 30/70-70/30 by wt parts.

It is preferred from the standpoint of excellent conductivity and improved intimate adherability, corrosion resistance, finished appearance and acid resistance, to use high conductive carbon black ($a_1$) and conductive powder ($a_2$) at the weight ratio of conductive powder ($a_2$)/high conductive carbon black ($a_1$) ranging from 0.4-20, preferably 2-18, inter alia, 5-16.

High conductive carbon black ($a_1$) and conductive powder ($a_2$) can also be blended, as combined, in an amount ranging 250-900 wt parts, in particular, 300-800 wt parts, inter alia, 500-700 wt parts, per 100 wt parts of combined solid content of the acrylic resin-type pigment-dispersing resin (B) and onium salt-type pigment-dispersing resin (C).

Where necessary, coloring pigment such as titanium oxide, red iron oxide or the like; extender such as clay, mica, baryta, talc, calcium carbonate, silica or the like; rust proofing agent such as aluminum phosphomolybdate, aluminum tripolyphosphate or the like; petroleum resin such as xylene resin or the like; organotin compound such as dibutyltin oxide, dioctyltin oxide or the like; surfactant and the like can further be added to the conductive filler-dispersion paste during the latter's dispersing treatment.

Formulation of Cationic Electrodeposition Coating Composition

A cationic electrodeposition coating composition according to the present invention can be formulated in the manner similar to ordinary formulation method of electrodeposition coating compositions. For example, it can be formulated by adding a conductive filler dispersion paste as formulated in the above-described manner, to an emulsion for electrodeposition coating composition comprising base resin and curing agent, and uniformly mixing them.

The blend ratio of the conductive filler dispersion paste in that occasion is such that high conductive carbon black ($a_1$) is at least 2 wt parts, preferably 3-35 wt parts, inter alia, 4-30 wt parts and the conductive filler (A) formed of the high conductive carbon black ($a_1$) and conductive powder ($a_2$), 30-100 wt parts, preferably 35-80 wt parts, inter alia, 40-70 wt parts, per 100 wt parts of combined solid content of the base resin and the curing agent. Desirable blend ratio of acrylic resin-type pigment-dispersing resin (B) and onium salt-type pigment-dispersing resin (C) as combined, which are used for formulation of the dispersion paste, is 3-20 wt parts, preferably 5-15 wt parts, inter alia, 8-12 wt parts, per 100 wt parts of combined solid content of the base resin and the curing agent.

Base Resin:

As the base resin in cationic electrodeposition coating compositions of the present invention, those routinely used as base resins for cationic electrodeposition coating compositions can be similarly used. More specifically, for example, resins having in their molecules cationizable groups such as amino, ammonium salt, sulfonium salt, phosphonium salt and the like (which are hereafter referred to as "cationic resin") can be named. As useful resin species, any of epoxy resin, acrylic reins, polybutadiene resin, alkyd resin, polyester resin is suitable. In particular, amine-added epoxy resin which is obtained through addition reaction of amino-containing compound with polyepoxide compound is advantageous.

As the amine-added epoxy resin, for example, (1) adducts of polyepoxide compound with primary mono- and poly-amines, secondary mono- and poly-amines or primary-secondary mixed polyamines (cf. for example, U.S. Pat. No. 3,984,299); (2) adducts of polyepoxide compound with secondary mono- and poly-amines having ketiminated primary amino group(s) (cf. for example, U.S. Pat. No. 4,017,438); and (3) a reaction product obtained by etherification of polyepoxide compound with hydroxy compound containing ketiminated primary amino group(s) (cf. for example, JP Sho 59 (1984)-43013A) can be named.

Polyepoxide compounds used for making the amine-added epoxy resin are those containing at least one, preferably at least two, epoxy groups per molecule. Generally, those having number-average molecular weight of at least 200, preferably 400-4,000, inter alia, 800-2,500; and epoxy equivalent of at least 160, preferably 180-2,500, inter alia, 400-1,500; are suitable. In particular, those obtained through reaction of polyphenolic compound with epichlorohydrin are preferred.

As the polyphenolic compound useful for forming the polyepoxide compound, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-2- or 3-tert-butylphenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak and the like can be named.

The polyepoxide compounds may be those partially reacted with polyol, polyether polyol, polyester polyol, polyamidoamine, polycarboxylic acid, polyisocyanate compound or the like, or may be those to which caprolactone such as c-caprolactone, acrylic monomer or the like is graft-polymerized.

As the primary mono- and poly-amines, secondary mono- and poly-amines or primary-secondary mixed polyamines which are used for preparation of above amine-added epoxy resin (1), for example, mono- or di-alkylamines such as monomethylamine, dimethylamine, monoethylamine, diethylamine, monoisopropylamine, diisopropylamine, monobutylamine, dibutylamine, and the like; alkanolamines such as monoethanolamine, diethanolamine, mono(2-hydroxypropyl)amine, monomethylaminoethanol and the like; and alkylene polyamines such as ethylenediamine, propylenediamine, butylenediamine, hexamethylenediamine, diethylenetriamine, triethylenetetramine and the like can be named.

As the secondary mono- and poly-amines having ketiminated primary amino groups, which are used for preparation of above amine-added epoxy resin (2), for example, ketimination products obtained by reacting the compounds having primary amino groups as chosen from the primary mono- and poly-amines, secondary mono- and poly-amines and primary-secondary mixed polyamines which are used for preparing the amine-added epoxy resin (1), (e.g., monomethylamine, monoethanolamine, ethylenediamine, diethylenetriamine and the like), with ketone compounds can be named.

As the hydroxy compounds having ketiminated primary amino groups which are used for preparation of above amine-added epoxy resin (3), for example, hydroxyl-containing ketimination products obtained by reacting those amines having primary amino groups and hydroxyl groups (e.g., monoethanolamine, mono(2-hydroxypropyl)amine and the like), chosen from the primary mono- and poly-amines, secondary mono- and poly-amines and primary-secondary mixed polyamines that are useful for preparation of above amine added epoxy resin (1), with ketone compounds can be used.

The amine-added epoxy resin also includes polyol-modified amine-added epoxy resin which is obtained through reaction of above-described polyepoxide compound, polyol compound obtained by adding caprolactone to a compound having at least two active hydrogen-containing groups per molecule and an amino-containing compound, which can be conveniently used.

Generally the compound having at least two active hydrogen-containing groups per molecule preferably has a molecular weight within a range of 62-5,000 and contains 2-30 active hydrogen-containing groups per molecule. As such active hydrogen-containing groups, for example, hydroxyl, primary amino and secondary amino groups can be named.

Specific examples of the compound having at least two active hydrogen-containing groups per molecule include low molecular weight polyols such as ethylene glycol, propylene glycol, 1,3-butylene glycol, 1,4-butanediol, 1,6-hexanediol, diethylene glycol, dipropylene glycol, neopentyl glycol, glycerine, trimethylolpropane, pentaerythritol and the like; linear or branched polyether polyols such as polyethylene glycol, polypropylene glycol, polytetramethylene glycol, bisphenol A polyethylene glycol ether and the like; polyester polyols formed through polycondensation reaction of organic dicarboxylic acid such as succinic acid, adipic acid, azelaic acid, sebacic acid, maleic acid, cyclohexanedicarboxylic acid, phthalic acid, isophthalic acid, terephthalic acid and the like or anhydrides thereof with organic diol such as above-named low molecular weight polyol, under the organic diol-excessive condition; amine compounds such as butylenediamine, hexamethylenediamine, tetraethylenepentamine, pentaethylenehexamine, monoethanolamine, diethanolamine, triethanolamine, mono(2-hydroxypropyl)amine, di(2-hydroxypropyl)amine, 1,3-bisaminomethylcyclohexanone, isophoronediamine, xylylenediamine, metaxylylenediamine, diaminodiphenylmethane, phenylenediamine, ethylenediamine, propylenediamine, diethylenetriamine, triethylenetetramine and the like; polyamide, polyamidoamine, amine adducts with epoxy compound, ketimine, aldimine and the like which are derived from piperazine or the foregoing amine compounds.

As the caprolactone useful in the addition reaction with above compound having at least two active hydrogen-containing groups per molecule, γ-caprolactone, ϵ-caprolactone, δ-caprolactone and the like can be named, ϵ-caprolactone being particularly preferred.

The addition reaction of the compound having at least two active hydrogen-containing groups per molecule with caprolactone can be conducted by per se known means, and by this addition reaction polyol compound can be obtained.

The amino-containing compound used for making the polyol-modified amine-added epoxy resin is a cationic property-imparting component for introducing amino groups into the resin and cationizing the resin. Compounds containing at least one active hydrogen per molecule to react with epoxy group can be used as such.

Specific examples of the compound include, for example, the primary mono- and poly-amines, secondary mono- and poly-amines and primary-secondary mixed polyamines used for making the amine-added epoxy resin (1); secondary mono- and poly-amines having ketiminated primary amino groups which are used for making the amine-added epoxy resin (2); and those useful as the hydroxy compounds having ketiminated primary amino groups which are used for making the amine-added epoxy resin (3).

Preferred cationic resins generally have number-average molecular weight within a range of 700-6,000, in particular, 1,000-4,000, and contain 0.5-3 equivalent, in particular, 0.7-2 equivalent, of cationic groups per kg of the resin.

Where the cationic resins have amino groups as cationizable groups, the resins can be made water-soluble or water-dispersible when neutralized with acid such as organic carboxylic acid, e.g., formic acid, acetic acid, propionic acid, lactic acid and the like or inorganic acid such as hydrochloric acid or sulfuric acid. Whereas, when the cationic resins contain onium salt groups such as ammonium salt group, sulfonium salt group or phosphonium salt group as cationizable group, they can be made water-soluble or water-dispersible as they are, without advance neutralization.

Xylene formaldehyde resin-modified amino-containing epoxy resin can also be used as the cationic resin. Such xylene formaldehyde resin-modified amino-containing epoxy resin includes amino-containing epoxy resin obtained by reacting an epoxy resin having an epoxy equivalent ranging 180-3,000 with a xylene formaldehyde resin and an amino-containing compound.

As the epoxy resin useful as a starting material for the amino-containing epoxy resin, epoxy resins similar to those as named for above-described amine-added epoxy resin are suitable.

Xylene formaldehyde resin is useful for internal plasticization (modification) of the epoxy resin and can be prepared, for example, by condensation reaction of xylene, formaldehyde and optionally phenols, in the presence of an acid catalyst. As the formaldehyde, for example, industrially readily available compounds capable of generating formaldehyde, such as formaline, paraformaldehyde, trioxane and the like can be used.

Said phenols include monovalent or divalent phenolic compounds having two or three reaction sites, specific examples including phenol, cresol, para-octylphenol, nonylphenol, bisphenol propane, bisphenol methane, resorcine, pyrocatechol, hydroquinone, para-tert-butylphenol, bisphenolsulfone, bisphenol ether, para-phenylphenol and the like. These can be used either singly or in combination of two or more. Among those, phenol and cresol are particularly preferred.

As the acid catalyst used for the condensation reaction of xylene, formaldehyde and optionally phenols, for example, sulfuric acid, hydrochloric acid, para-toluenesulfonic acid, oxalic acid and the like can be named. Generally speaking, sulfuric acid is particularly suitable.

The condensation reaction can be conducted, for example, by heating the reaction system comprising xylene, phenols, water, formaline or the like, to a refluxing temperature of these components, normally at about 80-about 100° C. The reaction normally completes in about 2-6 hours.

By the reaction under heating of xylene with formaldehyde and optionally phenols in the presence of an acid catalyst under the above-specified conditions, xylene formaldehyde resin can be obtained.

Thus obtained xylene formaldehyde resin generally has a viscosity within a range of 20-50,000 centipoise (25° C.), preferably 30-15,000 centipoise (25° C.), and generally preferably has a hydroxyl equivalent within a range of 100-50,000, in particular, 200-10,000.

The amino-containing compound is a cationic property-imparting component for introducing amino groups into the epoxy resin to cationize the epoxy resins, and as such, those compounds used in the occasion of making above cationic resins can be similarly used.

The reaction of epoxy resin with above-described xylene formaldehyde resin and amino-containing compound can be conducted by optional order, but generally it is convenient to simultaneously react xylene formaldehyde resin and amino-containing compound with epoxy resin.

The addition reaction is normally conducted in a suitable solvent, at about 80-about 170° C., preferably at about 90-about 150° C., for about 1-6 hours, preferably about 1-5 hours. As the solvent, for example, hydrocarbons such as toluene, xylene, cyclohexane, n-hexane and the like; esters such as methyl acetate, ethyl acetate, butyl acetate and the like, ketones such as acetone, methyl ethyl ketone, methyl isobutyl ketone, methyl amyl ketone and the like; amides such as dimethylformamide, dimethylacetamide, and the like; alcohols such as methanol, ethanol, n-propanol, isopropanol and the like; or mixtures of the foregoing can be named.

While the use ratio of these reactants in the addition reaction is not strictly limited but is suitably variable, generally suitable ranges based on the total solid weight of the three components of epoxy resin, xylene formaldehyde resin and amino-containing compound are as follows: 50-90 wt %, preferably 50-85 wt % of the epoxy resin; 5-45 wt %, preferably 6-43 wt % of the xylene formaldehyde resin; and 5-25 wt %, preferably 6-20 wt % of the amino-containing compound.

Curing Agent

As curing agent to be used in the cationic electrodeposition coating compositions of the present invetnion, blocked polyisocyanate compound, which is a product of approximately stoichiometric addition reaction of polyisocyanate compound with a blocking agent, is preferred from the standpoint of corrosion resistance and curability.

As the polyisocyanate compound to be used herein, those heretofore known can be used, for example, aromatic, aliphatic or alicyclic polyisocyanate compounds such as tolylene diisocyanate, xylylene diisocyanate, phenylene diisocyanate, diphenylmethane-2,4'-diisocyanate, diphenylmethane-4,4'-diisocyanate ("MDI"), crude MDI, bis(isocyanatomethyl)cyclohexane, tetramethylene diisocyanate, hexamethylene diisocyanate, methylene diisocyanate, isophorone diisocyanate and the like; cyclized polymers of these polyisocyanate compounds, isocyanate biuret bodies; and end isocyanate-containing compounds obtained by reacting excessive amount of these polyisocyanate compounds with low molecular weight active hydrogen-containing compounds such as ethylene glycol, propylene glycol, trimethylolpropane, hexanetriol, castor oil and the like. They can be used either singly or in combination of two or more.

Whereas, blocking agent adds to isocyanate groups in those polyisocyanate compounds and blocks them. The blocked polyisocyanate compounds formed by the addition desirably are stable at normal temperature and when heated to the baking temperature of coating film (normally about 100-about 200° C.), the blocking agent dissociates to regenerate free isocyanate groups.

As the blocking agents meeting such requirements, for example, lactam compounds such as ε-caprolactam and γ-butyrolactam; oxime compounds such as methyl ethyl ketoxime and cyclohexanone oxime; phenolic compounds such as phenol, para-t-butylphenol and cresol; aliphatic alcohols such as n-butanol and 2-ethylhexanol; aromatic alkanols such as phenylcarbinol and methylphenylcarbinol; and ether alcohol compounds such as ethylene glycol monobutyl ether and diethylene glycol monoethyl ether; and the like can be used.

Above-described amino-containing epoxy resin and blocked polyisocyanate compound can be used generally within the ranges of, based on the combined solid contents of the two, 50-95 wt %, in particular, 55-80 wt %, of the base resin; and 5-50 wt %, in particular, 20-45 wt %, of blocked polyisocyanate compound. Again from the standpoint of improvement in coating film performance, preferably the equivalent ratio of hydroxyl groups in the base resin and isocyanate groups in the curing agent is adjusted to fall within a range of 0.4-1.5, preferably 0.5-1.3, inter alia, 0.6-1.2, based on OH/NCO.

An emulsion for the cationic electrodeposition coating composition can be prepared, for example, through the steps of formulating dissolved varnish by optionally adding to resin and blocked polyisocyanate compound, additives such as organic tin compound, e.g., dibutyltin dilaurate, dioctyltin dilaurate, dibutyltin diacetate, dioctyltin benzoate, dibutyltin benzoate, dioctyltin dibenzoate, dibutyltin dibenzoate or the like; a nonionic surfactant such as polyoxyethylene alkyl ether, polyoxyethylene alkyl allyl ether, polyoxyethylene derivatives or the like; anti-cissing agent, film forming agent and the like; thoroughly mixing them, and adding to the varnish a neutralizing agent selected from formic acid, acetic acid, lactic acid, propionic acid, cytric acid, malic acid, sulfamic acid and mixtures of two or more thereof in an aqueous medium to convert the system to an aqueous dispersion.

A cationic electrodeposition coating composition is formulated by adding the earlier-described conductive filler-dispersion paste to the emulsion as prepared in the above, and diluting the mixture with an aqueous medium where necessary.

Thus obtained cationic electrodeposition coating composition can be applied onto substrate surface by electrocoating.

As the substrate to which the cationic electrodeposition coating composition is applicable is subject to no particular limitation so long as it allows electrodeposition coating thereon. The substrate may be, for example, metals such as stainless steel, iron, steel, copper, zinc, tin, aluminum, Alumite® and the like; alloys of these metals; sheets plated with these metals; and sheets formed by laminating these metals, which can be given surface treatment, primer-coating or the like for improving their corrosion resistance and adherability. For example, stainless steel can be given a chromium surface treatment.

As specific examples of substrate, automobile bodies, automobile parts, various industrial articles such as solid electrolytic fuel cells can be named.

Electrodeposition coating can be conducted generally using a bath containing a cationic electrodeposition coating composition of the present invention as diluted with deionized water or the like to a solid concentration of about 5—about 40 wt % and adjusted of its pH within a range of 5.0-9.0, normally under such conditions as the bath temperature of 15-35° C. and applied voltage of 30-300 V.

The thickness of the coating film formed of a cationic electrodeposition coating composition of the present invention is subject to no particular limitation, but generally preferred range is, in terms of cured coating film, 10-40 μm. Suitable baking temperature of the coating film generally ranges, at the substrate surface, from about 120 to about 220° C., preferably from about 140 to about 200° C., and the baking time, about 5-60 minutes, preferably about 10-30 minutes.

Electric conductivity of so formed electrocoated film is variable depending on its content of the conductive filler (A), in particular, that of high conductive carbon black ($a_1$), and according to the present invention conductive coating film having a resistance not higher than 100 Ω, inter alia, not higher than 50 Ω can be easily formed.

Therefore, cationic electrodeposition coating compositions of the present invention are particularly suitable for coating single surface or both surfaces of metallic separators of solid electrolytic fuel cells.

In the present specification, "resistance" of a coating film signifies contact resistance (Ω) as measured by fixing a test piece with its both front and back electrocoated on a measuring instrument and putting terminals of the instrument on the coating films on the front and back of the test piece. The "resistance" measurement can be conducted with CDM-03D Contact Resistance Meter (tradename, CUSTOM Co.).

EXAMPLES

Hereinafter the invention is explained more specifically, referring to working Examples, it being understood that the invention is not limited to these Examples only. In the Examples, "part" and "%" are by weight.

Production Example 1

Production of Acrylic Resin Type Pigment-dispersing Resin No. 1

Two-hundred (200) parts of ethylene glycol monobutyl ether was placed in a reaction vessel and heated to 120° C. Then a mixture (I) and mixture (II) of the following compositions were separately dropped into the reaction vessel over about 2 hours, while maintaining the reaction temperature at 120° C. and stirring the reaction solution. The reaction was conducted under nitrogen injection.

| Mixture (I) | |
|---|---|
| Blemmer PE 350[note 2] | 113 parts |
| N-vinylpyrrolidone | 126 parts |
| N,N-dimethylaminoethyl methacrylate | 15 parts |
| Methyl methacrylate | 50 parts |
| n-Butyl acrylate | 10 parts |
| Hydroxyethyl acrylate | 10 parts |
| **Mixture (II)** | |
| Azobisdimethylvaleronitrile | 18 parts |
| Ethylene glycol monobutyl ether | 50 parts |

[note 2]Blemmer PE-350: tradename. NOF Corporation, a reaction product of polyethylene glycol with methacrylic acid After completion of the dropping, 25 parts of azobisisobutyronitrile was added to the reaction solution, and two hours thereafter 25 parts of azobisisobutyronitrile was further added to the reaction solution. The reaction was conducted for the following two hours, while maintaining the temperature at 120° C. After the end of the reaction, unreacted monomers and ethylene glycol monobutyl ether were distilled off under reduced pressure, to provide acrylic resin type pigment-dispersing resin No. 1 having an amine value of 16.4 mgKOH/g and a solid content of 60%.

Production Example 2

Production of Ammonium Salt Type Pigment-dispersing Resin No. 2

To 1010 parts of EPICOAT 828EL (tradename, Japan Epoxy Resin Co., an epoxy resin), 390 parts of bisphenol A, 240 parts of polycaprolactone diol (number-average molecular weight: about 1200) and 0.2 part of dimethylbenzylamine were added and reacted at 130° C. until the epoxy equivalent reached about 1090.

Then 134 parts of dimethylethanolamine and 90 parts of acetic acid were added and reacted at 120° C. for 4 hours. The solid content of the reaction product was adjusted by addition of ethylene glycol monobutyl ether, to provide ammonium salt type pigment-dispersing resin No. 2 having an ammonium salt value of 44 mgKOH/g and a solid content of 60%.

Production Example 3

Production of Acid-neutralized Epoxy Resin Type Pigment-dispersing Resin No. 3.

A flask equipped with a stirrer, thermometer, dropping funnel and reflux condenser was charged with 398 parts of ethylene glycol monobutyl ether, 900 parts of EHPE-3150 (tradename, Daicel Chemical Co., Ltd., an alicyclic epoxy resin having an epoxy equivalent of 180), 315 parts of diethanolamine, 371 parts of an amine compound(note 3) and 1651 parts of an epoxy-amine product(note 4), which were slowly heated under mixing and stirring and reacted at 150° C. After reduction of the epoxy equivalent to zero was confirmed, ethylene glycol monobutyl ether was added to adjust the solid content, to provide acid-neutralized epoxy resin type pigment-dispersing resin No. 4 having an amine value of 96.5 mgKOH/g and a solid content of 60%.

(note 3) amine compound:

An amine compound having an amine value of 150 and a solidifying point of 76° C., which was obtained by a process comprising charging a reaction vessel equipped with a thermometer, stirrer, reflux condenser and water-separator with 285 parts of stearic acid, 104 parts of hydroxyethylaminoethylamine and 80 parts of toluene; slowly heating them under mixing and stirring while removing the toluene where necessary, and raising the temperature to separate and remove 18 parts of water of the reaction; and removing the remaining toluene under reduced pressure.

(note 4) epoxyamine product:

An epoxyamine product having a solid content of 80%, which was obtained by a process comprising charging a flask equipped with a stirrer, thermometer, dropping funnel and reflux condenser with 105 parts of diethanolamine, 760 parts of bisphenol A diglycidyl ether having an epoxy equivalent of 190, 456 parts of bisphenol A and 330 parts of ethylene glycol monobutyl ether, and reacting the components at 150° C. until the residual epoxy group became zero.

Production Example 4

Production of Conductive Filler-dispersion Paste No. 1

A ball mill was charged with 16.7 parts (solid content: 10 parts) of above pigment-dispersing resin No. 1 having a solid content of 60%, 4 parts of Ketjen Black EC(note 5), 60 parts of VULKAN XC-72(note 7) and 130.7 parts of deionized water, and the components were dispersed for 20 hours to provide a conductive filler-dispersion paste No. 1 having a solid content of 35%.

Production Examples 5-27

Production of Conductive Filler-dispersion Paste Nos. 2-24

Conductive filler-dispersion paste Nos. 2-24 were obtained in the manner similar to Production Example 4, using the components as shown in the following Table 1 (Examples) and Table 2 (Comparative Examples) at the indicated blend ratios.

TABLE 1

| | | Production Example 4 | Production Example 5 | Production Example 6 | Production Example 7 | Production Example 8 | Production Example 9 | Production Example 10 |
|---|---|---|---|---|---|---|---|---|
| Conductive filler-dispersion paste | | No. 1 | No. 2 | No. 3 | No. 4 | No. 5 | No. 6 | No. 7 |
| Pigment-dispersing resin No. 1 | | 16.7 (10) | 16.7 (10) | 8.3 (5) | 8.3 (5) | 8.3 (5) | 8.3 (5) | 8.3 (5) |
| Pigment-dispersing resin No. 2 | | | | 8.3 (5) | 8.3 (5) | 8.3 (5) | 8.3 (5) | 8.3 (5) |
| ($a_1$) | Ketjen Black EC (note 5) | 4 | 7 | 4 | 7 | 5 | 10 | 4 |
| | Ketjen Black EC 600JD (note 6) | | | | | | | |
| ($a_2$) | VULKAN XC-72 (note 7) | 60 | 57 | 60 | 57 | 59 | 54 | |
| | UFG-5 (note 8) | | | | | | | 60 |
| Deionized water | | 130.7 | 130.7 | 130.8 | 130.8 | 130.8 | 130.8 | 130.8 |
| 35% Conductive filler dispersion paste (solid content) | | 211.4 (74) | 211.4 (74) | 211.4 (74) | 211.4 (74) | 211.4 (74) | 211.4 (74) | 211.4 (74) |
| Ketjen Black ($a_1$) | | 4 | 7 | 4 | 7 | 5 | 10 | 4 |
| Conductive powder ($a_2$) | | 60 | 57 | 60 | 57 | 59 | 54 | 60 |
| Conductive powder | | 15.0 | 8.1 | 15.0 | 8.1 | 11.8 | 5.4 | 15.0 |

TABLE 1-continued

| | | | | | | | |
|---|---|---|---|---|---|---|---|
| Conductive powder $(a_2)$/Ketjen Black $(a_1)$ | | | | | | | |
| Ketjen Black $(a_1)$ + conductive powder $(a_2)$ | 64 | 64 | 64 | 64 | 64 | 64 | 64 |

| | | Production Example 11 | Production Example 12 | Production Example 13 | Production Example 14 | Production Example 15 | Production Example 16 |
|---|---|---|---|---|---|---|---|
| Conductive filler-dispersion paste | | No. 8 | No. 9 | No. 10 | No. 11 | No. 12 | No. 13 |
| Pigment-dispersing resin No. 1 | | 8.3 (5) | 8.3 (5) | 5 (3) | 3.3 (2) | 11.7 (7) | 13.3 (8) |
| Pigment-dispersing resin No. 2 | | 8.3 (5) | 8.3 (5) | 11.7 (7) | 13.3 (8) | 5 (3) | 3.3 (2) |
| $(a_1)$ | Ketjen Black EC (note 5) | | | 4 | 4 | 4 | 4 |
| | Ketjen Black EC 600JD (note 6) | 4 | 7 | | | | |
| $(a_2)$ | VULKAN XC-72 (note 7) | 60 | 57 | 60 | 60 | 60 | 60 |
| | UFG-5 (note 8) | | | | | | |
| Deionized water | | 130.8 | 130.8 | 130.7 | 130.8 | 130.7 | 130.8 |
| 35% Conductive filler dispersion paste (solid content) | | 211.4 (74) | 211.4 (74) | 211.4 (74) | 211.4 (74) | 211.4 (74) | 211.4 (74) |
| Ketjen Black $(a_1)$ | | 4 | 7 | 4 | 4 | 4 | 4 |
| Conductive powder $(a_2)$ | | 60 | 57 | 60 | 60 | 60 | 60 |
| Conductive powder $(a_2)$/Ketjen Black $(a_1)$ | | 15.0 | 8.1 | 15.0 | 15.0 | 15.0 | 15.0 |
| Ketjen Black $(a_1)$ + conductive powder $(a_2)$ | | 64 | 64 | 64 | 64 | 64 | 64 |

TABLE 2

| | | Production Example 17 | Production Example 18 | Production Example 19 | Production Example 20 | Production Example 21 | Production Example 22 |
|---|---|---|---|---|---|---|---|
| Conductive filler-dispersion paste | | No. 14 | No. 15 | No. 16 | No. 17 | No. 18 | No. 19 |
| Pigment-dispersing resin No. 1 | | | | | | | |
| Pigment-dispersing resin No. 2 | | 16.7 | 16.7 (10) | 16.7 (10) | 16.7 (10) | 16.7 (10) | (10) |
| Pigment-dispersing rein No. 3 | | | | | | | 16.7 (10) |
| 10% Acetic acid | | | | | | | 0.3 |
| $(a_1)$ | Ketjen Black EC (note 5) | 4 | 7 | 45 | | | 4 |
| | Ketjen Black EC 600JD (note 6) | | | | | | |
| $(a_2)$ | VULKAN XC-72 (note 7) | 60 | 57 | 15 | 60 | | 60 |
| | UFG-5 (note 8) | | | | | 60 | |
| Deionized water | | 130.7 | 130.7 | 123.3 | 123.3 | 123.3 | 130.4 |
| 35% Conductive filler dispersion paste (solid content) | | 211.4 (74) | 211.4 (74) | 200 (70) | 200 (70) | 200 (70) | 211.4 (74) |
| Ketjen Black $(a_1)$ | | 4 | 7 | 45 | 0 | 0 | 4 |
| Conductive powder $(a_2)$ | | 60 | 57 | 15 | 60 | 60 | 60 |
| Conductive powder $(a_2)$/Ketjen Black $(a_1)$ | | 15 | 8.1 | 0.3 | — | — | 15 |
| Ketjen Black $(a_1)$ + conductive powder $(a_2)$ | | 64 | 64 | 60 | 60 | 60 | 64 |

| | Production Example 23 | Production Example 24 | Production Example 25 | Production Example 26 | Production Example 27 |
|---|---|---|---|---|---|
| Conductive filler-dispersion paste | No. 20 | No. 21 | No. 22 | No. 23 | No. 24 |
| Pigment-dispersing resin No. 1 | | 8.3 (5) | 8.3 (5) | 8.3 (5) | 8.3 (5) |

TABLE 2-continued

| | | | | | |
|---|---|---|---|---|---|
| Pigment-dispersing resin No. 2 | | 8.3 (5) | 8.3 (5) | 8.3 (5) | 8.3 (5) |
| Pigment-dispersing rein No. 3 | 16.7 (10) | | | | |
| 10% Acetic acid | 0.3 | | | | |
| ($a_1$) Ketjen Black EC (note 5) | 45 | 1.8 | 1.8 | | |
| Ketjen Black EC 600JD (note 6) | | | | | |
| ($a_2$) VULKAN XC-72 (note 7) | 15 | 27 | | 60 | |
| UFG-5 (note 8) | | | 27 | | 60 |
| Deionized water | 123 | 73.8 | 73.8 | 131.7 | 131.7 |
| 35% Conductive filler dispersion paste (solid content) | 200 (70) | 110.9 (38.8) | 110.9 (38.8) | 200 (70) | 200 (70) |
| Ketjen Black ($a_1$) | 45 | 1.8 | 1.8 | 0 | 0 |
| Conductive powder ($a_2$) | 15 | 27 | 27 | 60 | 60 |
| Conductive powder ($a_2$)/Ketjen Black ($a_1$) | 0.3 | 15 | 15 | — | — |
| Ketjen Black ($a_1$) + conductive powder ($a_2$) | 60 | 28.8 | 28.8 | 60 | 60 |

(note 5)
Ketjen Black EC: tradename, Lion Corporation, high conductive carbon black, DBP oil absorption = 368 ml/100 g
(note 6)
Ketjen Black EC 600 JD: tradename, Lion Corporation, high conductive carbon black, DBP oil absorption = 495 ml/100 g
(note 7)
VULKAN XC-72: tradename, Cabot Corporation, furnace black, DBP oil absorption = 178 ml/100 g
(note 8)
UFG-5: tradename, Showa Denko K. K., graphite, DBP oil absorption = 55 ml/100 g

Production Example 28

Production of Base Resin

A separable flask of 2 liters in capacity which was equipped with a thermometer, reflux condenser and stirrer was charged with 240 parts of 50% formaline, 55 parts of phenol, 101 parts of 98% industrial sulfuric acid and 212 parts of meta-xylene, and the components were reacted at 84-88° C. for 4 hours. After termination of the reaction, the reaction system was let stand to allow separation of the resin phase and aqueous sulfuric acid phase. The resin phase was washed with water three times and unreacted meta-xylene was stripped off for 20 minutes under the conditions of 20-30 mmHg/120-130° C. to provide 240 parts of a phenol-modified xylene formaldehyde resin having a viscosity of 1050 centipoise (25° C.).

Into a separate flask 1,000 parts of EPICOAT 828EL (tradename, Japan Epoxy Resin Co., an epoxy resin having an epoxy equivalent of 190 and a molecular weight of 350), 400 parts of bisphenol A and 0.2 part of dimethylbenzylamine were added and reacted therein at 130° C., until the epoxy equivalent value rose to 750.

Then 300 parts of the phenol-modified xylene formaldehyde resin, 140 parts of diethanolamine and 65 parts of a ketimination product of diethylenetriamine were added and reacted at 120° C. for 4 hours, followed by addition of 420 parts of diethylene glycol monobutyl ether. Thus a base resin which was a xylene formaldehyde resin-modified amino-containing epoxy resin having a solid content of 80% was obtained.

Production Example 29

Production of Blocked Polyisocyanate Curing Agent

A reaction vessel was charged with 270 parts of COSMONATE M-200(tradename, Mitsui Chemicals, Inc., a crude MDI) and 25 parts of methyl isobutyl ketone and its inside temperature was raised to 70° C. Into the vessel 15 parts of 2,2-dimethylolbutanoic acid was gradually added, and then 118 parts of ethylene glycol monobutyl ether was dropped to carry out the reaction at 70° C. for an hour. The reaction system was cooled to 60° C. and 152 parts of propylene glycol was added.

While maintaining said temperature, samples were taken from time to time and given infrared absorption spectral analysis until extinction of absorption by unreacted isocyanate group was confirmed. Thus a blocked polyisocyanate curing agent having a solid resin content of 90% was obtained.

Production Example 30

Production of Emulsion No. 1 for Cationic Electrodeposition Coating Composition

Mixing and uniformly stirring 93.8 parts (solid content=75 parts) of the base resin as obtained in Production Example 28, 27.8 parts (solid content=25 parts) of the blocked polyisocyanate curing agent as obtained in Production Example 29, and 15 parts of 10% formic acid, 157.4 parts of deionized water was dropped into the mixture under violent stirring, over about 15 minutes. Thus an emulsion No. 1 for cationic electrodeposition coating composition having a solid content of 34% was obtained. The equivalent ratio of the hydroxyl groups in the base resin to the isocyanate groups in the curing agent (OH/NCO) was 1/0.57.

Production Example 31

Production of Emulsion No. 2 for Cationic Electrodeposition Coating Composition

Mixing and uniformly stirring 75 parts (solid content=60 parts) of the base resin as obtained in Production Example 28, 44.4 parts (solid content=40 parts) of the blocked polyisocyanate curing agent as obtained in Production Example 29, 2.5 parts of dioctyltin dibenzoate (solid content=1 part) and 15 parts of 10% formic acid, 160 parts of deionized water was dropped into the mixture under violent stirring, ever about 15 minutes. Thus an emulsion No. 2 for cationic electrodeposition coating composition having a solid content of 34 % was obtained. The equivalent ratio of the hydroxyl groups in the base resin to the isocyanate groups in the curing agent (OH/NCO) was 1/1.13.

Example 1

To 294 parts (solid content=100 parts) of emulsion No. 1 as obtained in Production Example 30, 211.4 parts (solid content=74 parts) of conductive filler dispersion paste No. 1 as obtained in Production Example 4 and 364.6 parts of deionized water were added to provide cationic electrodeposition coating composition No. 1 having a solid content of 20%.

Examples 2-15

Cationic electrodeposition coating composition Nos. 2-15 were prepared in the manner similar to Example 1, each having the blend ratios as indicated in the following Table 3.

TABLE 3

| | Example 1 | Example 2 | Example 3 | Example 4 | Example 5 | Example 6 | Example 7 | Example 8 |
|---|---|---|---|---|---|---|---|---|
| Cationic electrodeposition coating composition | No. 1 | No. 2 | No. 3 | No. 4 | No. 5 | No. 6 | No. 7 | No. 8 |
| Emulsion No. 1 | 294 (100) | 294 (100) | | | | | | |
| Emulsion No. 2 | | | 297 (101) | 297 (101) | 297 (101) | 297 (101) | 297 (101) | 297 (101) |
| Conductive filler dispersion paste No. 1 | | | 211.4 (74) | | | | | |
| Conductive filler dispersion paste No. 2 | | | | 211.4 (74) | | | | |
| Conductive filler dispersion paste No. 3 | 211.4 (74) | | | | 211.4 (74) | | | |
| Conductive filler dispersion paste No. 4 | | 211.4 (74) | | | | 211.4 (74) | | |
| Conductive filler dispersion paste No. 5 | | | | | | | 211.4 (74) | |
| Conductive filler dispersion paste No. 6 | | | | | | | | 211.4 (74) |
| Conductive filler dispersion paste No. 7 | | | | | | | | |
| Conductive filler dispersion paste No. 8 | | | | | | | | |
| Conductive filler dispersion paste No. 9 | | | | | | | | |
| Conductive filler dispersion paste No. 10 | | | | | | | | |
| Conductive filler dispersion paste No. 11 | | | | | | | | |
| Conductive filler dispersion paste No. 12 | | | | | | | | |
| Conductive filler dispersion paste No. 13 | | | | | | | | |
| Deionized water | 364.6 | 364.6 | 361.6 | 361.6 | 361.6 | 361.6 | 361.6 | 361.6 |
| 20% Electrocoating bath | 870 (174) | 870 (174) | 870 (174) | 870 (174) | 870 (174) | 870 (174) | 870 (174) | 870 (174) |

| | Example 9 | Example 10 | Example 11 | Example 12 | Example 13 | Example 14 | Example 15 |
|---|---|---|---|---|---|---|---|
| Cationic electrodeposition coating composition | No. 9 | No. 10 | No. 11 | No. 12 | No. 13 | No. 14 | No. 15 |
| Emulsion No. 1 | | | | | | | |
| Emulsion No. 2 | 297 (101) | 297 (101) | 297 (101) | 297 (101) | 297 (101) | 297 (101) | 297 (101) |
| Conductive filler dispersion paste No. 1 | | | | | | | |
| Conductive filler dispersion paste No. 2 | | | | | | | |
| Conductive filler dispersion paste No. 3 | | | | | | | |
| Conductive filler dispersion paste No. 4 | | | | | | | |
| Conductive filler dispersion paste No. 5 | | | | | | | |
| Conductive filler dispersion paste No. 6 | | | | | | | |
| Conductive filler dispersion paste No. 7 | 211.4 (74) | | | | | | |
| Conductive filler dispersion paste No. 8 | | 211.4 (74) | | | | | |
| Conductive filler dispersion paste No. 9 | | | 211.4 (74) | | | | |
| Conductive filler dispersion paste No. 10 | | | | 211.4 (74) | | | |
| Conductive filler dispersion paste No. 11 | | | | | 211.4 (74) | | |

TABLE 3-continued

| | | | | | | | |
|---|---|---|---|---|---|---|---|
| Conductive filler dispersion paste No. 12 | | | | | | 211.4 (74) | |
| Conductive filler dispersion paste No. 13 | | | | | | | 211.4 (74) |
| Deionized water | 361.6 | 361.6 | 361.6 | 361.6 | 361.6 | 361.6 | 361.6 |
| 20% Electrocoating bath | 870 (174) | 870 (174) | 870 (174) | 870 (174) | 870 (174) | 870 (174) | 870 (174) |

(Numerals in the parentheses indicate solid content.)

Comparative Example 1

To 294 parts (solid content=100 parts) of the emulsion No. 1 as obtained in Production Example 30, 211.4 parts (solid content=74 parts) of the conductive filler dispersion paste No. 14 as obtained in Production Example 17 and 364.6 parts of deionized water were added to provide cationic electrodepo-sition coating composition No. 16 having a solid content of 20%.

Comparative Examples 2-13

Cationic electrodeposition coating composition Nos. 17-28 were prepared in the manner similar to Comparative Example 1, using the blend ratios as indicated in the following Table 4.

TABLE 4

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Cationic electrodeposition coating composition | No. 16 | No. 17 | No. 18 | No. 19 | No. 20 | No. 21 | No. 22 |
| Emulsion No. 1 | 294 (100) | 294 (100) | 294 (100) | 294 (100) | 294 (100) | 294 (100) | 294 (100) |
| Emulsion No. 2 | | | | | | | |
| Conductive filler dispersion paste No. 14 | 211.4 (74) | | | | | | |
| Conductive filler dispersion paste No. 15 | | 211.4 (74) | | | | | |
| Conductive filler dispersion paste No. 16 | | | 200 (70) | | | | |
| Conductive filler dispersion paste No. 17 | | | | 200 (70) | | | |
| Conductive filler dispersion paste No. 18 | | | | | 200 (70) | | |
| Conductive filler dispersion paste No. 19 | | | | | | 211.4 (74) | |
| Conductive filler dispersion paste No. 20 | | | | | | | 200 (70) |
| Conductive filler dispersion paste No. 21 | | | | | | | |
| Conductive filrsion paste No. 22 | | | | | | | |
| Conductive filler dispersion paste No. 23 | | | | | | | |
| Conductive filler dispersion paste No. 24 | | | | | | | |
| Deionized water | 364.6 | 364.6 | 356 | 356 | 356 | 364.6 | 356 |
| 20% Electrocoating bath | 870 (174) | 870 (174) | 850 (170) | 850 (170) | 850 (170) | 870 (174) | 850 (170) |

| | Comparative Example 8 | Comparative Example 9 | Comparative Example 10 | Comparative Example 11 | Comparative Example 12 | Comparative Example 13 |
|---|---|---|---|---|---|---|
| Cationic electrodeposition coating composition | No. 23 | No. 24 | No. 25 | No. 26 | No. 27 | No. 28 |
| Emulsion No. 1 | 294 (100) | 294 (100) | 294 (100) | 294 (100) | | |
| Emulsion No. 2 | | | | | 297 (101) | 297 (101) |
| Conductive filler dispersion paste No. 14 | | | | | | |
| Conductive filler dispersion paste No. 15 | | | | | | |
| Conductive filler dispersion paste No. 16 | | | | | | |
| Conductive filler dispersion paste No. 17 | | | | | | |
| Conductive filler dispersion paste No. 18 | | | | | | |

TABLE 4-continued

| | | | | | | |
|---|---|---|---|---|---|---|
| Conductive filler dispersion paste No. 19 | | | | | | |
| Conductive filler dispersion paste No. 20 | | | | | | |
| Conductive filler dispersion paste No. 21 | 110.9 (38.8) | | | | | |
| Conductive filler dispersion paste No. 22 | | 110.9 (38.8) | | | | |
| Conductive filler dispersion paste No. 23 | | | 200 (70) | | | |
| Conductive filler dispersion paste No. 24 | | | | 200 (70) | | |
| Deionized water | 289.1 | 289.1 | 356 | 356 | 358 | 358 |
| 20% Electrocoating bath | 694 (138.8) | 694 (138.8) | 850 (170) | 850 (170) | 855 (171) | 855 (171) |

(Numerals in the parentheses indicate solid content.)

Preparation of Test Coated Panels

A 0.8×150×70 mm stainless steel plate (SUS304) was immersed in each of those cationic electrodeposition coating compositions as obtained in Examples 1-15 and Comparative Examples 1-13. Using each of the plates as the cathode, electrocoated coating film having a cured thickness of 20 μm was formed under an applied voltage of 50V, while adjusting the electricity-applying time. After washing the film with water, the film was baked at 170° C. for 30 minutes to provide a test coated panel. The coating compositions used in the tests and the result of the performance tests of the test coated panels were as shown in the following Tables 5 and 6.

TABLE 5

| | | Example 1 | Example 2 | Example 3 | Example 4 | Example 5 | Example 6 | Example 7 | Example 8 |
|---|---|---|---|---|---|---|---|---|---|
| Cationic electrodeposition coating compositon | | No. 1 | No. 2 | No. 3 | No. 4 | No. 5 | No. 6 | No. 7 | No. 8 |
| Performance test | Electric resistance Ω (note 9) | 25 | 20 | 20 | 20 | 20 | 15 | 20 | 20 |
| | Filtration residue mg/L (note 10) | ○ | ○ | ○ | ○ | ○ | ○ | ○ | ○ |
| | L-letter finished appearance (note 11) | ○ | ○ | ○ | ○ | ○ | ○ | ○ | ○ |
| | Corrosion resistance (note 12) | ○ | ○ | ◎ | ◎ | ◎ | ◎ | ◎ | ◎ |
| | Acid resistance (note 13) | ○ | ○ | ◎ | ◎ | ○ | ○ | ○ | ○ |

| | | Example 9 | Example 10 | Example 11 | Example 12 | Example 13 | Example 14 | Example 15 |
|---|---|---|---|---|---|---|---|---|
| Cationic electrodeposition coating compositon | | No. 9 | No. 10 | No. 11 | No. 12 | No. 13 | No. 14 | No. 15 |
| Performance test | Electric resistance Ω (note 9) | 40 | 25 | 20 | 25 | 20 | 25 | 30 |
| | Filtration residue mg/L (note 10) | ○ | ○ | ○ | ○ | ○ | ○ | ○ |
| | L-letter finished appearance (note 11) | ○ | ○ | ○ | ○ | ○ | ○ | ○ |
| | Corrosion resistance (note 12) | ◎ | ◎ | ◎ | ◎ | ◎ | ◎ | ◎ |
| | Acid resistance (note 13) | ○ | ◎ | ○ | ○ | ○ | ◎ | ◎ |

TABLE 6

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Cationic electrodeposition coating composition | | No. 16 | No. 17 | No. 18 | No. 19 | No. 20 | No. 21 | No. 22 |
| Performance test | Electric resistance Ω (note 9) | 125 | 120 | 225 | 265 | 280 | 1800 | 2440 |
| | Filtration residue mg/L (note 10) | ○ | ○ | ○ | ○ | ○ | Δ | Δ |
| | L-letter finished appearance (note 11) | ○ | ○ | ○ | ○ | ○ | X | X |
| | Corrosion resistance (note 12) | ○ | ○ | ○ | ○ | ○ | ○ | ○ |
| | Acid resistance (note 13) | Δ | Δ | Δ | Δ | Δ | Δ | Δ |

| | | Comparative Example 8 | Comparative Example 9 | Comparative Example 10 | Comparative Example 11 | Comparative Example 12 | Comparative Example 13 |
|---|---|---|---|---|---|---|---|
| Cationic electrodeposition coating composition | | No. 23 | No. 24 | No. 25 | No. 26 | No. 27 | No. 28 |
| Performance test | Electric resistance Ω (note 9) | 310 | 350 | 270 | 290 | 260 | 275 |
| | Filtration residue mg/L (note 10) | ○ | ○ | ○ | ○ | ○ | ○ |
| | L-letter finished appearance (note 11) | ○ | ○ | ○ | ○ | ○ | ○ |
| | Corrosion resistance (note 12) | ○ | ○ | ○ | ○ | ○ | ○ |
| | Acid resistance (note 13) | ○ | ○ | Δ | Δ | ○ | ○ |

(note 9)

Electric resistance: Contact resistance was measured by fixing each of the test coated plate with its both front and back electrocoated on a measuring instrument and putting terminals of the instrument on the coating films on the front and back of the test plate. The measurement of the contact resistance was conducted with CDM-03D Contact Resistance Meter (tradename, CUSTOM Co., a contact resistance measuring instrument).

(note 10) Filtration residue: Each cationic electrodeposition coating composition was hermetically sealed under stirring for 4 weeks at 30° C., and then filtered through a 400-mesh filtration net. The amount of the residue (mg/L) was measured:

○: the residual amount was less than 10 mg/L

Δ: the residual amount was 11-15 mg/L; and

X: the residual amount exceeds 15 mg/L.

(note 11)

L-letter finishing property: Each cationic electrodeposition coating composition was applied onto a substrate test plate with its fore-end bent in L-form, under an applied voltage of 50 V, with the electricity-passing time so adjusted as to render the cured film thickness 20 μm. The condition of the coating film on the horizontal plane at the front bent in L-form was visually evaluated.

◎: good and no problem;

○: coating film slightly foggy but acceptable as a product article;

Δ: coating film showed bittiness and face roughening, and

X: coating film showed notable bittiness and face roughening.

(note 12)

Corrosion resistance: Coating film on each test coated plate was cross-cut to the depth reaching the substrate surface, and the test coated plate was given a saline solution spray test for 840 hours following JIS Z-2371. Corrosion resistance was evaluated by the following standard according to width of rust and blister development from the knife cuts:

◎: the maximum width of rusting and blistering from the cuts was less than 2 mm (single side);

○: the maximum width of rusting and blistering from the cuts was no less than 2 mm but less than 3 mm (single side);

Δ: the maximum width of rusting and blistering from the cuts was no less than 3 mm but less than 4 mm (single side);

X: the maximum width of rusting and blistering from the cuts exceeded 4 mm (single side)

(note 13)

Acid resistance: Each test coated plate was immersed in 1 mol sulfuric acid solution of 70° C. After 5 hours' immersion test, the plate was taken out, immediately washed with tap water and left standing in a room. After 10 minutes' standing, the plate was given an adherability test of its coating film. The adherability was evaluated according to the area of remaining coating film, when Cello-Tape was intimately stuck on the coated surface and then rapidly peeled off:

◎: No abnormality caused, peeled area = 0%;

○: peeled area = 1-10%;

Δ: peeled area = 11-50%; and

X: peeled area = 51-100%.

INDUSTRIAL APPLICABILITY

The cationic electrodeposition coating compositions of the present invention are suitable for coating industrial parts which are required to have conductivity and corrosion resistance and have uneven surfaces.

The invention claimed is:

1. A cationic electrodeposition coating composition comprising a conductive filler dispersion paste, base resin and a curing agent, said paste being formed by mixing a conductive filler (A) which is composed of Ketjen Black ($a_1$), furnace black ($a_2$), a pigment-dispersing resin (B) and a pigment-dispersing resin (C) to form a dispersion;

(i) the coating composition containing 30-100 wt parts of a conductive filler (A) which contains at least 2 wt parts of Ketjen Black ($a_1$), per 100 wt parts of combined solid content of the base resin and the curing agent;

(ii) the weight ratio of the furnace black ($a_2$)/ Ketjen Black ($a_1$) being within a range of 5-16;

(iii) the pigment-dispersing resin (B) being acrylic resin-derived pigment-dispersing resin formed by copolymerization of (meth)acrylic monomer ($b_1$) which is modified with mono- or poly-alkylene glycol or a monoether derivative thereof; nitrogen-containing, radical-polymerizable unsaturated monomer ($b_2$) which comprises unsaturated monomer ($b_2$-1) having nitrogen-containing heterocycle; and other radical-polymerizable unsaturated monomer ($b_3$);

(iv) the pigment-dispersing resin (C) being an onium salt type pigment-dispersing resin;

(v) the coating composition being capable of forming a coating film having an electric resistance not higher than 50Ω; and (vi) the coating composition containing the onium salt-type pigment-dispersing resin (C) within a range as resin (B)/resin (C) of 10/90-90/10 in wt parts, based on 100 wt parts of the combined solid content of the acrylic resin-type pigment-dispersing resin (B) and the onium salt-type pigment-dispersing resin (C).

2. A cationic electrodeposition coating composition according to claim 1, in which the Ketjen Black($a_1$) has a DBP oil absorption within a range of 250-600 ml/100 g.

3. A cationic electrodeposition coating composition according to claim 1, in which the furnace black ($a_2$) has a DBP oil absorption within a range of 30-250 ml/100 g.

4. A cationic electrodeposition coating composition according to claim 1, in which the modified (meth)acrylic monomer ($b_1$) is a monomer represented by the following formula (1),

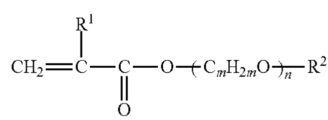

(1)

in which $R^1$ stands for hydrogen or methyl; $R^2$ stands for hydrogen, $C_1$-$C_{20}$ alkyl, aryl or aralkyl; m is an integer of 2-12; and n is an integer of 1-30.

5. A cationic electrodeposition coating composition according to claim 1, in which the unsaturated monomers ($b_2$-1) having nitrogen-containing heterocycle are vinylpyrrolidones or vinylimidazoles.

6. A cationic electrodeposition coating composition according to claim 1, in which the pigment-dispersing resin (B) is an acrylic resin-type pigment-dispersing resin which is obtained by copolymerization of 3-98 wt parts of modified (meth)acrylic monomer ($b_1$), 2-97 wt parts of nitrogen-containing, radical-polymerizable unsaturated monomer ($b_2$), and 0-91 wt parts of other radical-polymerizable unsaturated monomer ($b_3$), per 100 wt parts of the combined solid content of the modified (meth)acrylic monomer ($b_1$), nitrogen-containing, radical-polymerizable unsaturated monomer ($b_2$) and other radical polymerizable unsaturated monomer ($b_3$).

7. A cationic electrodeposition coating composition according to claim 1, in which the pigment-dispersing resin (B) has a number-average molecular weight within a range of 500-150,000.

8. A cationic electrodeposition coating composition according to claim 1, in which the onium-salt type pigment-dispersing resin (C) is ammonium salt type epoxy resin prepared through a reaction of epoxy resin with compound containing tertiary amino group or groups and carboxylic acid.

9. A cationic electrodeposition coating composition according to claim 1, which contains the acrylic resin-type pigment-dispersing resin (B) and onium salt-type pigment-dispersing resin (C) within a range of 3-20 wt parts in total, per 100 wt parts of the combined solid content of the base resin and curing agent.

10. A cationic electrodeposition coating composition according to claim 1, in which the conductive filler (A) contains 3-35 wt parts of the Ketjen Black ($a_1$) per 100 wt parts of the combined solid content of the base resin and curing agent.

11. A cationic electrodeposition coating composition according to claim 1, in which the weight ratio of the furnace black ($a_2$)/ Ketjen Black ($a_1$) is within a range of 2-18.

12. A cationic electrodeposition coating composition according to claim 1, which contains 35-80 wt parts of the conductive filler (A).

13. A cationic electrodeposition coating composition according to claim 1, which contains the Ketjen Black ($a_1$) and furnace black ($a_2$) within a range of 250-900 wt parts in total, per 100 wt parts of the combined solid content of the acrylic resin-type pigment-dispersing resin (B) and onium salt-type pigment dispersing resin (C).

14. A cationic electrodeposition coating composition according to claim 1, in which the base resin is xylene formaldehyde resin-modified, amino-containing epoxy resin.

15. A cationic electrodeposition coating composition according to claim 1, in which the curing agent is blocked polyisocyanate compound.

16. A method for forming a conductive coating film which comprises electrocoating a substrate with a cationic electrodeposition coating composition as set forth in claim 1.

17. Metallic separators for solid electrolytic fuel cells, which are coated with a cationic electrodeposition coating composition as set forth in claim 1.

* * * * *